United States Patent
Ishizuka

(10) Patent No.: US 8,201,896 B2
(45) Date of Patent: Jun. 19, 2012

(54) VEHICLE BRAKE APPARATUS AND METHOD

(75) Inventor: Motoi Ishizuka, Kawasaki (JP)

(73) Assignee: Nissan Motor Co., Ltd., Yokohama (JP)

( * ) Notice: Subject to any disclaimer, the term of this patent is extended or adjusted under 35 U.S.C. 154(b) by 1183 days.

(21) Appl. No.: 11/644,960

(22) Filed: Dec. 26, 2006

(65) Prior Publication Data

US 2007/0194621 A1    Aug. 23, 2007

(30) Foreign Application Priority Data

Feb. 22, 2006    (JP) ................. 2006-045902

(51) Int. Cl.
*B60T 8/88* (2006.01)
*B60T 15/14* (2006.01)

(52) U.S. Cl. ............... 303/122; 303/3; 303/191

(58) Field of Classification Search ........... 303/3, 10, 303/11, 20, 122, 122.03–122.05, 122.09, 303/122.12, 191
See application file for complete search history.

(56) References Cited

U.S. PATENT DOCUMENTS

| | | | |
|---|---|---|---|
| 3,673,400 A * | 6/1972 | Ito | 702/33 |
| 3,948,568 A | 4/1976 | Leiber | |
| 4,321,520 A * | 3/1982 | Ueda et al. | 318/696 |
| 4,827,897 A * | 5/1989 | Yamada et al. | 123/497 |
| 4,927,213 A | 5/1990 | Burgdore | |
| 6,183,050 B1 | 2/2001 | Ganzel | |
| 6,402,264 B1 | 6/2002 | Otomo | |
| 6,439,962 B1 * | 8/2002 | Ato | 451/6 |
| 6,474,751 B1 * | 11/2002 | Yamaguchi et al. | 303/116.4 |
| 6,672,147 B1 * | 1/2004 | Mazet | 73/114.43 |
| 2001/0006306 A1 * | 7/2001 | Kagawa et al. | 303/20 |

FOREIGN PATENT DOCUMENTS

| | | |
|---|---|---|
| DE | 22 51 278 A1 | 5/1974 |
| DE | 23 42 307 A1 | 2/1975 |
| DE | 39 03 532 A1 | 8/1989 |
| DE | 38 08 902 A1 | 10/1989 |
| GB | 1 449 038 | 9/1976 |
| JP | H01-293261 | 11/1989 |
| JP | H07-032999 | 2/1995 |
| JP | 1054286 A * | 2/1998 |
| JP | 1077992 A * | 3/1998 |
| JP | H11-348759 | 12/1999 |
| JP | 2000-001162 | 1/2000 |
| JP | 2000-118388 | 4/2000 |

* cited by examiner

*Primary Examiner* — Melody Burch
(74) *Attorney, Agent, or Firm* — Global IP Counselors, LLP

(57) ABSTRACT

A vehicle brake apparatus has a wheel cylinder that generates a braking force when a pump is rotated in a first direction and does not generate the braking force when the pump is rotated in a second direction. A brake control section operates a valve to open a channel between the pump and the wheel cylinder and rotates the pump in the first direction to increase the braking force in accordance with a driver braking operation. The brake control section operates the valve to close the channel between the pump and the wheel cylinder to maintain the braking force in accordance with the driver braking operation. The brake control section rotates the pump in the second direction when the driver braking operation is not performed. The diagnosis section detects a rotation state of the pump while the pump rotates in the second direction to diagnose abnormalities in the pump.

14 Claims, 6 Drawing Sheets

VEHICLE BRAKE APPARATUS AND METHOD

CROSS-REFERENCE TO RELATED APPLICATIONS

This application claims priority to Japanese Patent Application No. 2006-045902 filed on Feb. 22, 2006. The entire disclosure of Japanese Patent Application No. 2006-045902 is hereby incorporated herein by reference.

BACKGROUND OF THE INVENTION

1. Field of the Invention

The present invention relates to a vehicle brake apparatus that employs a brake-by-wire system.

2. Background Information

Japanese Laid-Open Patent Application Publication No. 11-348759 discloses a conventional vehicle brake apparatus utilizing a brake-by-wire system in which a fluid pressure is supplied to wheel cylinders by using pumps or the like to generate a braking force that corresponds to a braking force requested by a driver, while channels from a master cylinder to the wheel cylinders are closed off. In the conventional brake-by-wire system, the channels from the master cylinder to the wheel cylinders are opened during a fail-safe operation so that the fluid pressure of the master cylinder is supplied to the wheel cylinders to ensure braking force.

Furthermore, the conventional vehicle brake apparatus disclosed in the above mentioned reference is configured to diagnose abnormalities in the pumps by operating the pumps and monitoring the fluid pressure discharged toward the wheel cylinders while the channels from the pumps to the wheel cylinders are closed off by valves when the driver is not braking the vehicle.

In view of the above, it will be apparent to those skilled in the art from this disclosure that there exists a need for an improved vehicle brake apparatus. This invention addresses this need in the art as well as other needs, which will become apparent to those skilled in the art from this disclosure.

SUMMARY OF THE INVENTION

In the conventional vehicle brake apparatus disclosed in the above mentioned reference, the valves installed between the pumps and the wheel cylinders are usually opened when the driver is not braking so that the fluid pressure can be applied to the wheel cylinders upon the driver starting a brake operation. Therefore, the valves need to be closed and opened every time the pumps are diagnosed for failures. Thus, the durability of the valves may be reduced in the conventional vehicle brake apparatus.

Accordingly, one object of the present invention is to provide a vehicle brake apparatus utilizing a brake-by-wire system that can prevents loss of durability in the valves, which are configured and arrange to selectively open and close the channels between the pumps and the wheel cylinders, when abnormalities in the pumps are diagnosed.

In order to achieve the above mentioned object, a vehicle brake apparatus is provided that basically comprises a wheel cylinder, a pump, a first valve, a brake control section and a diagnosis section. The wheel cylinder is configured and arranged to generate a braking force with a fluid pressure of a fluid transmitted from a fluid source. The pump is disposed in a first channel between the fluid source and the wheel cylinder. The pump is configured and arranged to selectively rotate in one of a first direction that generates the braking force in the wheel cylinder and a second direction that does not generate the braking force in the wheel cylinder. The first valve is configured and arranged to selectively close the first channel between the pump and the wheel cylinder. The brake control section is configured to control the first valve to open the first channel between the pump and the wheel cylinder and control the pump to rotate in the first direction so that a discharge pressure from the pump is transmitted to the wheel cylinder when the braking force is increased in accordance with a brake operation by a driver. The brake control section is further configured to control the first valve to close the first channel between the pump and the wheel cylinder when the braking force is maintained in accordance with the brake operation by the driver. The brake control section is further configured to control the pump to rotate in the second direction when the brake operation by the driver is not performed. The diagnosis section is configured to detect a rotation state of the pump while the pump is controlled to rotate in the second direction, and to diagnose abnormalities in the pump based on the rotation state of the pump.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
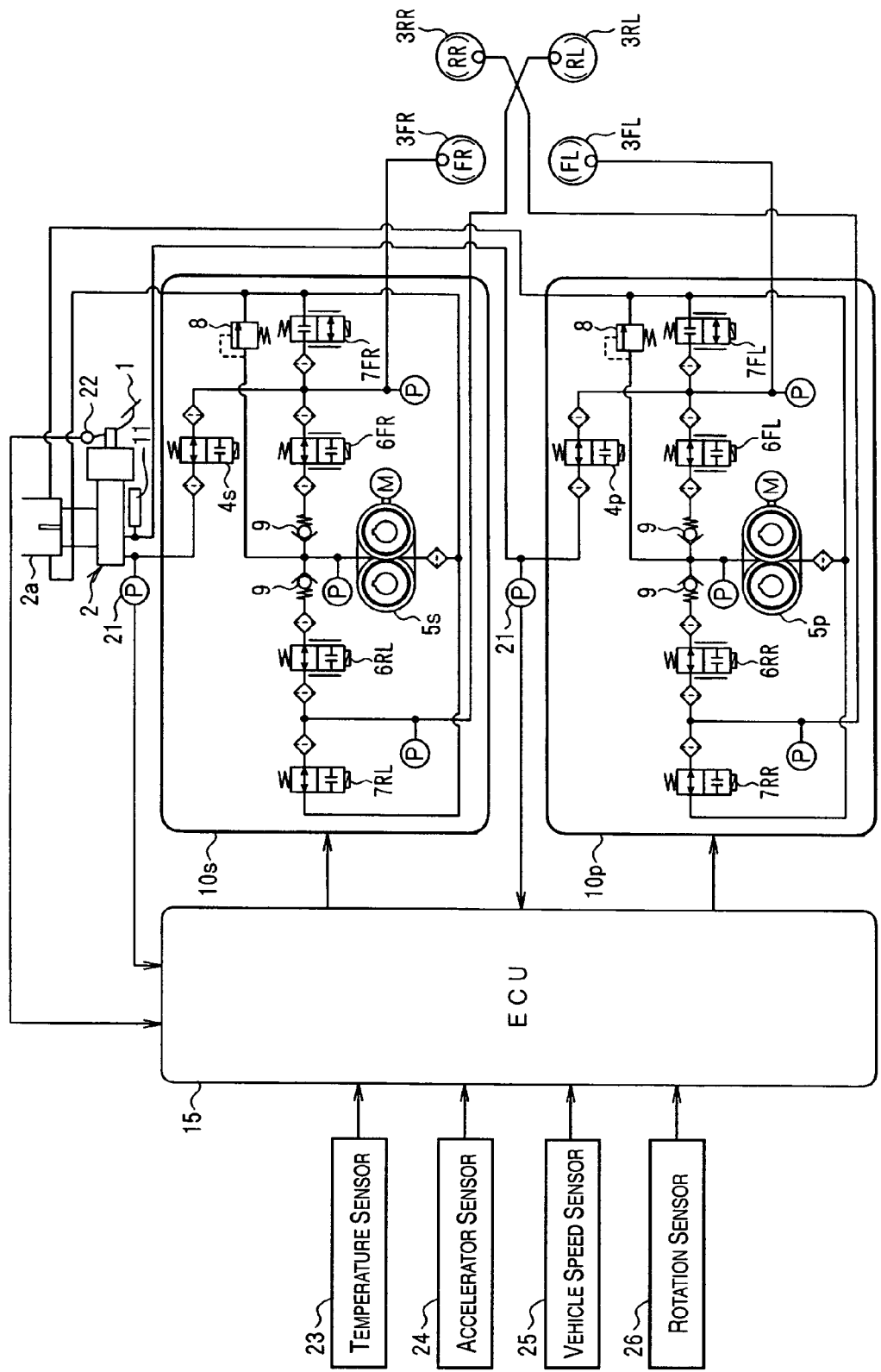
FIG. 1 is an overall system block diagram of a vehicle brake apparatus utilizing a brake-by-wire system in accordance with a first embodiment of the present invention.

Referring initially to FIG. 1, a vehicle brake apparatus is illustrated in accordance with a first embodiment of the present invention. FIG. 1 is an overall system block diagram of the vehicle brake apparatus utilizing a brake-by-wire system. As shown in FIG. 1, the brake system of the vehicle brake apparatus includes a brake pedal 1, a master cylinder 2, a plurality of wheel cylinders 3FL, 3FR, 3RL and 3RR, primary-side and secondary-side gate valves 4p and 4s, primary-side and secondary-side gear pumps 5p and 5s, a plurality of inlet valves 6FL, 6FR, 6RL and 6RR, a plurality of outlet valves 7FL, 7FR, 7RL and 7RR, a pair of relief valves 8, a plurality of check valves 9, a stroke simulator 11, a control unit 15 (a brake control section and a diagnosis section), a pressure sensor 21, a stroke sensor 22, a temperature sensor 23, an accelerator sensor 24, a vehicle speed sensor 25, and a rotation sensor 26 (a rotation detecting section).

The master cylinder 2 is configured and arranged to convert a pedal depression force inputted by a driver via the brake pedal 1 into hydraulic pressure. The master cylinder 2 is coupled to a primary-side channel that is communicated with the front left wheel cylinder 3FL and a secondary-side channel that is communicated with the front right wheel cylinder 3FR. The master cylinder 2 is coupled to a reservoir tank 2a (fluid source) as shown in FIG. 1. The wheel cylinder 3FR (or 3FL) preferably corresponds to the wheel cylinder of the present invention.

Each of the front left and front right wheel cylinders 3FL and 3FR and the rear left and rear right wheel cylinders 3RL and 3RR is preferably housed within a disk brake coupled to a vehicle wheel in which a disk rotor is squeezed by a brake pad to generate a braking force. Alternatively, the vehicle can be configured and arranged such that each of the front left and front right wheel cylinders 3FL and 3FR and the rear left and rear right wheel cylinders 3RL and 3RR is housed within a drum brake coupled to the vehicle wheel in which a brake shoe is pushed into the inner peripheral surface of a brake drum to generate a braking force.

The secondary-side of the hydraulic brake system of the brake control apparatus includes the gate valve 4s, the gear pump 5s, the inlet valves 6FR and 6RL, the outlet valves 7FR and 7RL, the relief valve 8 and the check valves 9. The gate valve 4s is configured and arranged to selectively close off a channel between the master cylinder 2 and the wheel cylinder 3FR. The gear pump 5s is mounted in a channel for communicating the channel between the gate valve 4s and the wheel cylinder 3FR with the reservoir tank 2a of the master cylinder 2. More specifically, the gear pump 5s is disposed in a first channel between the reservoir tank 2a and the wheel cylinder 3FR. The gear pump 5s is configured and arranged to be rotated by a pump motor coupled thereto in a forward direction (first direction) that generates braking force in the wheel cylinder 3FR and in a reverse direction (second direction) that does not generate braking force in the wheel cylinder 3FR. The inlet valve 6FR is configured and arranged to selectively close off a channel between the gear pump 5s and the wheel cylinder 3FR while the channel between the gate valve 4s and the wheel cylinder 3FR remained communicated. The outlet valve 7FR is configured and arranged to selectively open a second channel between the reservoir tank 2a and the wheel cylinder 3FR independently from the first channel that passes through the gear pump 5s and the inlet valve 6FR. Thus, the inlet valve 6FR (or 6FL in the primary-side) preferably corresponds to the first valve of the present invention, and the outlet valve 7FR (or 7FL in the primary-side) preferably corresponds to the second valve of the present invention.

The inlet valve 6RL is disposed in a channel between the gear pump 5s and the inlet valve 6FR with the wheel cylinder 3RL. The inlet valve 6RL is configured and arranged to selectively close off the channel between the gear pump 5s and the inlet valve 6FR with the wheel cylinder 3RL. The outlet valve 7RL is disposed in a channel communicating the wheel cylinder 3RL with the reservoir tank 2a and the gear pump 5s. The outlet valve 7RL is configured and arranged to selectively close off the channel communicating the wheel cylinder 3RL with the reservoir tank 2a and the gear pump 5s.

Furthermore, the relief valve 8 is disposed in a channel communicating between a section between the reservoir tank 2a and the outlet valve 7FR and a section between the gear pump 5s and the inlet valve 6FR. The relief valve 8 is configured and arranged to selectively open the channel to the reservoir tank 2a so that a hydraulic pressure is kept at or below a prescribed value when the hydraulic pressure in the area between the gear pump 5s and the wheel cylinders 3FR and 3RL exceeds the prescribed value.

The check valves 9 are disposed in the channel between the gear pump 5s and the inlet valve 6FR and in the channel between the gear pump 5s and the inlet valve 6RL, respectively. The check valves 9 are configure and arranged to allow oil (fluid) flow in one direction from the gear pump 5s to the inlet valves 6FR and 6RL, respectively.

The gate valve 4s, the inlet valves 6FR and 6RL, and the outlet valves 7FR and 7RL are preferably arranged as two-port, two-position switching/spring offset-type electromagnetically operated valves. The gate valve 4s, the inlet valves 6FR and 6RL, and the outlet valve 7RL are configured and arranged to open the channels in an un-energized normal position, while the outlet valve 7FR is configured and arranged to close off the channel in the un-energized normal position. The inlet valves 6FR and 6RL and the outlet valve 7RL may be configured and arranged to open channels in an energized offset position.

According to the configuration described above, when the gear pump 5s is driven to rotate in the forward direction, the fluid stored in the reservoir tank 2a is drawn in and the discharge pressure is transmitted to the inlet valves 6FR and 6RL. When the inlet valve 6FR is not energized and is opened, the outlet valve 7FR is not energized and is closed, and the gate valve 4s is energized and closed, the hydraulic pressure in the front right wheel cylinder 3FR is increased by the discharge pressure from the gear pump 5s. Also, when the inlet valve 6RL is not energized and is opened, and the outlet valve 7RL is energized and closed, the hydraulic pressure in the rear left wheel cylinder 3RL is increased by the discharge pressure from the gear pump 5s.

In addition, when the inlet valve 6FR is energized and closed, the outlet valve 7FR is not energized and is closed, and the gate valve 4s is energized and closed, the channels between the front right wheel cylinder 3FR and the gear pump 5s and the reservoir tank 2a are closed off. Therefore, the hydraulic pressure in the front right wheel cylinder 3FR is maintained. When the inlet valve 6RL is energized and closed, and the outlet valve 7RL is energized and closed, the channels between the rear left wheel cylinder 3RL and the gear pump 5s and the reservoir tank 2a are closed off. Therefore, the hydraulic pressure in the rear left wheel cylinder 3RL is maintained.

Furthermore, when the inlet valve 6FR is energized and closed, the outlet valve 7FR is energized and opened, and the gate valve 4s is energized and closed, the hydraulic pressure in the front right wheel cylinder 3FR is reduced by communication with the reservoir tank 2a. When the inlet valve 6RL is energized and closed, and the outlet valve 7RL is not energized and is opened, the hydraulic pressure in the rear left wheel cylinder 3RL is reduced by communication with the reservoir tank 2a.

If the gear pump 5s is no longer driven to rotate in the forward direction when the hydraulic pressure is maintained or reduced in the wheel cylinders 3FR and 3RL, the check valves 9 function the same way as when the inlet valves 6FR and 6RL are closed (i.e., the check valves 9 are configured and arranged to prevent the fluid from flowing from the gear pump 5s toward the wheel cylinders 3FR and 3RL). Therefore, in such case, the inlet valves 6FR and 6RL may be left open when the hydraulic pressure is maintained or reduced in the wheel cylinders 3FR and 3RL.

When the gate valve 4s, the inlet valve 6FR, and the outlet valve 7FR are all in an un-energized state, the hydraulic pressure in the master cylinder 2 is transmitted directly to the front right wheel cylinder 3FR.

The primary-side of the hydraulic brake system includes the gate valve 4p, the gear pump 5p, the inlet valves 6FL and 6RR, the outlet valves 7FL and 7RR, the relief valve 8, and the check valves 9, which are identical to the corresponding components of the secondary-side and operate in the same manner as those of the secondary-side. Therefore, the detailed descriptions of the primary-side of the hydraulic brake system are omitted for the sake of brevity.

The gate valve 4s, the gear pump 5s, the inlet valves 6FR and 6RL, and the outlet valves 7FR and 7RL constitute a secondary-side brake actuator 10s. The gate valve 4p, the gear pump 5p, the inlet valves 6FL and 6RR, and the outlet valves 7FL and 7RR constitutes a primary-side brake actuator 10p.

The control unit 15 is configured to control driving of the secondary-side brake actuator 10s and the primary-side brake actuator 10p. A diagonal split system separated into a front-right and rear-left brake system and a front-left and rear-right brake system is employed in this embodiment of the present invention. However, it will be apparent to those skilled in the art from this disclosure that a front/rear split system separated into a front-left and right brake system and a rear-left and right brake systems may also be employed to carry out the present invention.

The control unit 15 preferably includes a microcomputer with a self-diagnosis control program that controls the self-diagnosis process for abnormalities in the gear pumps 5s and 5p as discussed below. The control unit 15 can also include other conventional components such as an input interface circuit, an output interface circuit, and storage devices such as a ROM (Read Only Memory) device and a RAM (Random Access Memory) device. The microcomputer of the control unit 15 is programmed to control the primary-side brake actuator 10p and the secondary-side brake actuator 10s. The memory circuit stores processing results and control programs such as ones for the self-diagnosis process that are run by the processor circuit. The control unit 15 is operatively coupled to the various components of the vehicle brake apparatus in a conventional manner. The internal RAM of the control unit 15 stores statuses of operational flags and various control data. The control unit 15 is capable of selectively controlling any of the components of the brake control system in accordance with the control program. It will be apparent to those skilled in the art from this disclosure that the precise structure and algorithms for the control unit 15 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

When the brake-by-wire system is implemented, the control unit 15 is configured to control braking force by increasing, maintaining, and reducing the hydraulic pressure in the wheel cylinders 3FL to 3RR in accordance with an operation of the brake pedal 1 by the driver in a state in which the gate valves 4s and 4p are closed. More specifically, the control unit 15 is configured to read a master cylinder pressure determined by the pressure sensor 21 or a pedal stoke determined by the stroke sensor 22, and to drive or control the brake actuators 10s and 10p to generate braking force that corresponds to the brake operation by the driver (e.g., braking force that corresponds to the master cylinder pressure or the pedal stroke detected). Such brake-by-wire system is a conventional system that is well known in the art. Since the brake-by-wire system is well known in the art, the structures and operations thereof will not be discussed or illustrated in detail herein. Rather, it will be apparent to those skilled in the art from this disclosure that the components can be any type of structure and/or programming that can be used to carry out the present invention.

The stroke simulator 11 is connected to the channel that communicates the master cylinder 2 with the gate valve 4p. The stroke simulator 11 includes a single-acting cylinder that moves elastically in accordance with hydraulic pressure. Therefore, when a brake-by-wire system is implemented, a pedal stroke or pedal reaction force appropriate for the braking operation (depression of the brake pedal 1) by the driver is directed or simulated by the elastic stroking of the stroke simulator 11 when the hydraulic pressure in the master cylinder 2 increases in accordance with the braking operation of the driver.

When the brake-by-wire system is not implemented during a fail-safe operation due to a pump failure or the like, none of the gate valves 4s and 4p, the inlet valves 6FL and 6FR, and the outlet valves 7FL and 7FR is energized. In such case, communication is established and mechanically backed up between the master cylinder 2 and the front left and front right wheel cylinders 3FL and 3FR, ensuring braking force in the front wheels coupled to the front left and front right wheel cylinders 3FL and 3FR. In this embodiment of the present invention, the brake system is arranged so that only the braking force of the front wheels can be mechanically backed up. However, it is apparent to those skilled in the art from this disclosure that the brake system can also be arranged so that both the front and rear wheels, or the rear wheels alone, can be mechanically backed up during the fail-safe operation.

The control unit 15 is configured to read an atmospheric temperature detected by the temperature sensor 23, an accelerator operation state detected by the accelerator sensor 24, a vehicle speed detected by the vehicle speed sensor 25, and motor rotation angles of the pump motors coupled to the gear pumps 5s and 5p detected by a rotation sensor 26. The control unit 15 is then configured to execute a self-diagnosis process in accordance with a flowchart shown in FIG. 2 to diagnose abnormalities in the gear pumps 5s and 5p. The control process described in the flowchart of FIG. 2 basically corresponds to the diagnosis section of the present invention.

Figure 2:
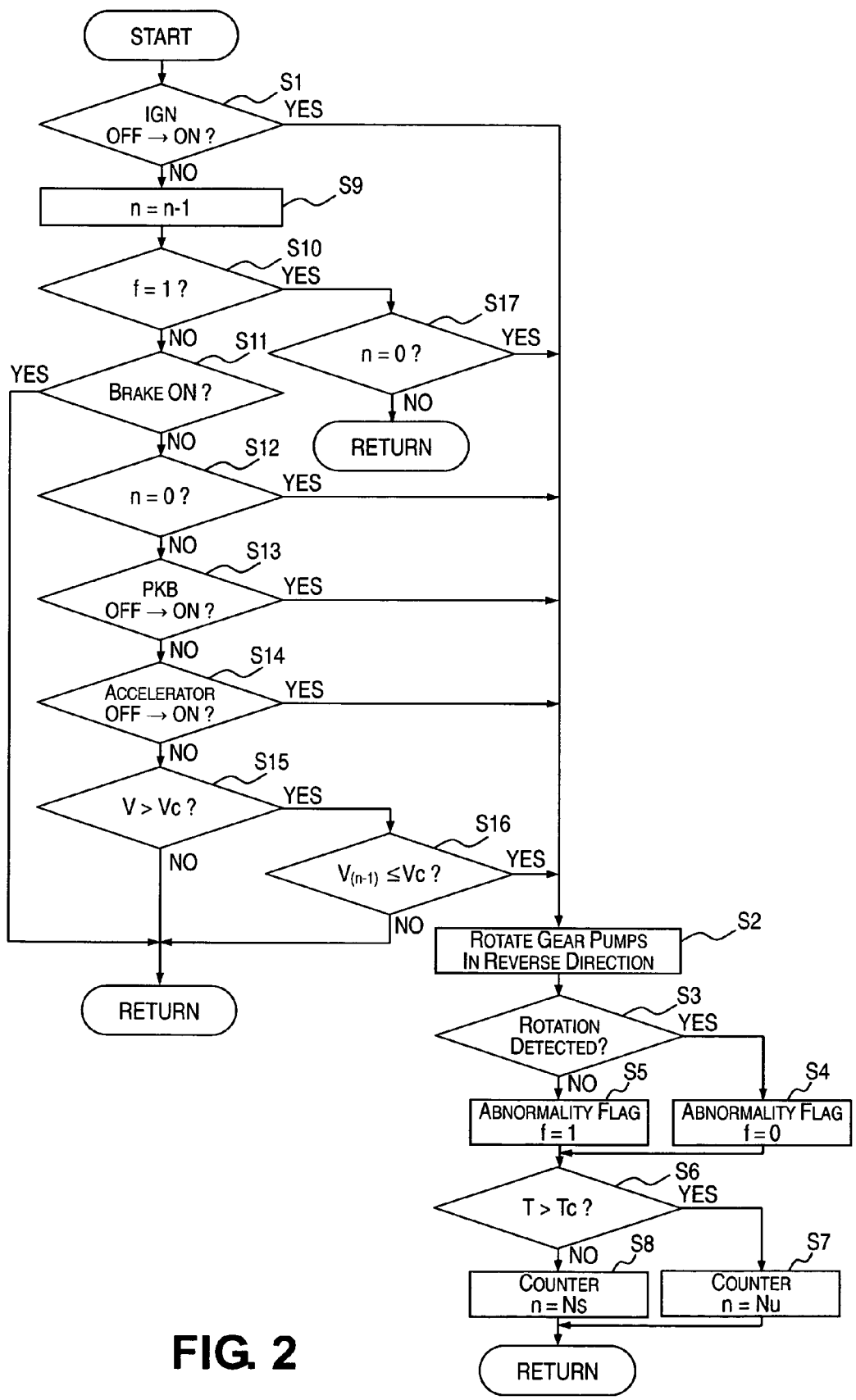
FIG. 2 is a flowchart illustrating a self-diagnosis process executed in a control unit of the vehicle brake apparatus in accordance with the first embodiment of the present invention.

Referring now to FIG. 2, the self-diagnosis process executed by the control unit 15 will be explained in detail. The self-diagnosis process shown in FIG. 2 is preferably executed at prescribed time intervals (e.g., 10 msec).

First, in step S1, the control unit 15 is configured to determine whether an ignition switch (IGN) has just been turned on. If the control unit 15 determines that the ignition switch has not just been turned on (e.g., the current control cycle is not the first control cycle after the ignition switch has been turned on) in step S1, then the process advances to step S9. On the other hand, if the control unit 15 determines that the ignition switch has just been turned on (e.g., the current control cycle is the first control cycle after the ignition switch has been turned on) in step S1, then it is determined that an initial diagnosis is needed for the gear pumps 5s and 5p. Thus, the process advances to step S2.

Figure 3:
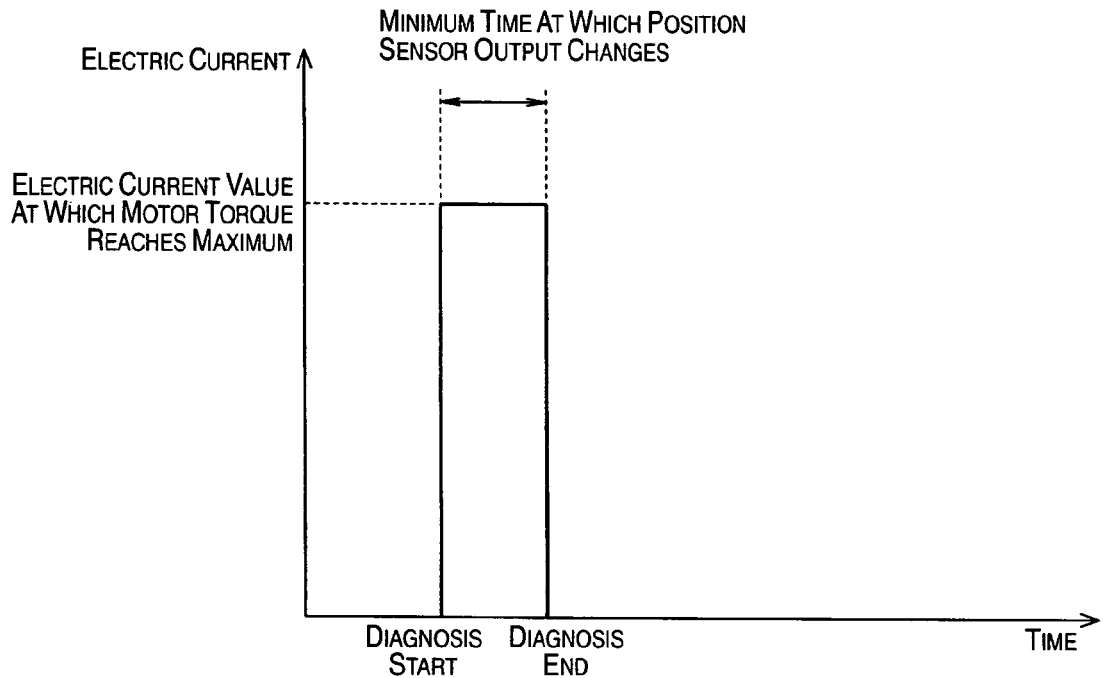
FIG. 3 is a time chart illustrating a characteristic of an electric current supplied to rotate a gear pump during the self-diagnosis process in accordance with the first embodiment of the present invention.

In step S2, a prescribed electric current is applied for a prescribed period of time (resolution period) to the pump motors of the gear pumps 5s and 5p as shown in FIG. 3 to rotate the gear pumps 5s and 5p in the reverse direction.

Figure 4:
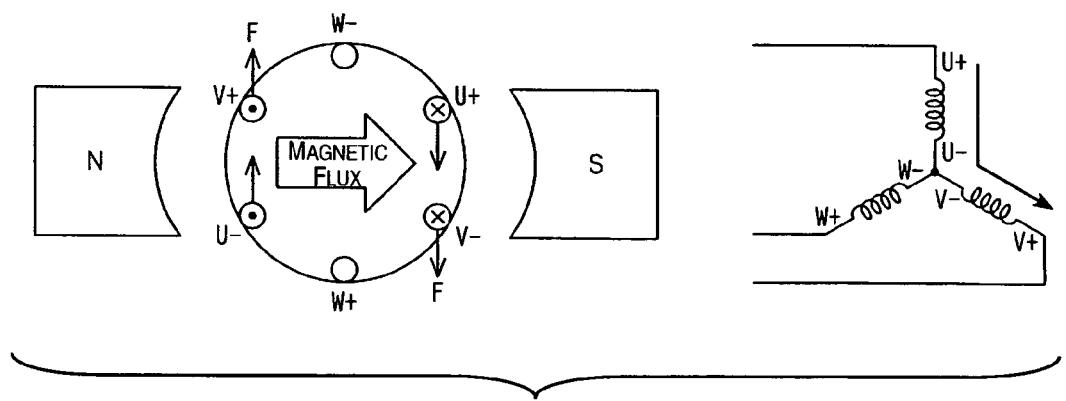
FIG. 4 is a schematic diagram of a motor used as an example of a pump motor in accordance with the first embodiment of the present invention.
Figure 5:
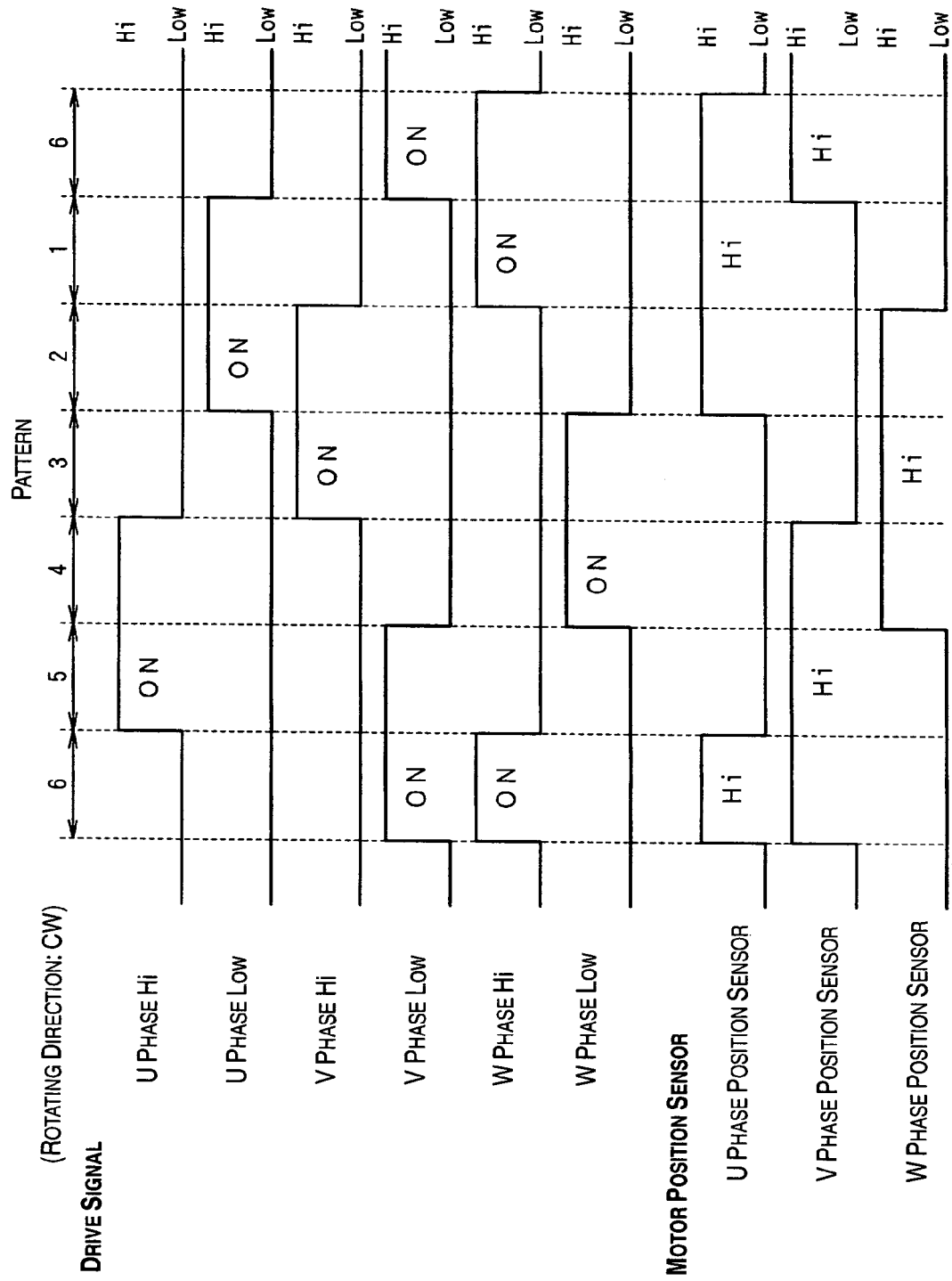
FIG. 5 is a time chart illustrating output signals from a rotation sensor of the vehicle brake apparatus in accordance with the first embodiment of the present invention.

As seen in FIG. 3, the prescribed electric current used in step S2 is preferably set to a starting current (rush current), e.g. about 170 A, at which a motor torque reaches a maximum value. The prescribed period of time is set to an amount of time required for the motor rotation angle to reach the resolution of the rotation sensor 26 after the control unit 15 starts driving the gear pumps 5s and 5p to rotate from the normal state. When, for example, the three-phase AC motor shown in FIG. 4 is used as the pump motor, and when the pump motor is rotated, any signal selected from the U-phase, V-phase, or W-phase signals detected by the rotation sensor 26 may change at each ⅙ of a rotation as shown in FIG. 5. Therefore, a ⅙ rotation is the minimum rotation angle (i.e., resolution of the rotation sensor 26) that can be detected by the rotation sensor 26. FIG. 4 shows a schematic diagram of the three-phase AC motor in a state of pattern 5 illustrated in FIG. 5. In the first embodiment of the present invention, the motor rotation angles of the pump motors of the gear pumps 5s and 5p are detected in order to detect the pump rotation angles since the pump rotation angle and the motor rotation angle are the same. However, it will be apparent to those skilled in the art from this disclosure that the vehicle brake apparatus can be arranged to detect the pump rotation angles of the gear pumps 5s and 5p instead of the motor rotation angles of the pump motors to carry out the present invention.

Next, in step S3, the control unit 15 is configured to determine whether the rotations of the pump motors have been detected by the rotation sensor 26 while the gear pumps 5s and 5p are driven to rotate in the reverse direction in step S2. When the rotation of the pump motors have been detected in step S3, then the gear pumps 5s and 5p are determined to be in a normal state (no abnormalities in the gear pumps 5s and 5p), and thus, the process advances to step S4. On the other hand, when the rotations of the pump motors have not been detected in step S3, then the gear pumps 5s and 5p are determined to have abnormalities, such as a contamination, an increase in the viscosity of the fluid, or freezing of the gear pumps 5s and 5p. Thus, in such case, the process advances to step S5.

In step S4, the control unit 15 is configured to reset a value of an abnormality flag f to "0" (f=0), and then, the process advances to step S6. The control unit 15 is configured to implement the brake-by-wire system while the value of the abnormality flag f is set to "0" (f=0).

In step S5, the control unit 15 is configured to set the value of the abnormality flag f to "1" (f=1), and then, the process advances to step S6. The control unit 15 is configured to halt the brake-by-wire system and to display a warning light, for example, to inform the driver when the value of the abnormality flag f is set to "1" (f=1).

In step S6, the control unit 15 is configured to determine whether an atmospheric temperature T detected by the temperature sensor 23 is greater than a prescribed value Tc. When the control unit 15 determines that the atmospheric temperature T is greater than the prescribed value Tc (T≧Tc) in step S6, then it is determined that the fluid viscosity will not increase or the gear pumps 5s and 5p will not freeze. Thus, the process advances to step S7. On the other hand, when the control unit 15 determines that the atmospheric temperature T is equal to or less than the prescribed temperature Tc (T≦Tc) in step S6, then it is determined that the fluid viscosity may increase or the gear pumps 5s and 5p may freeze, and the process advances to step S8.

In step S7, the control unit 15 is configured to set a value of a counter (timer) n to a normal value Nu, and then, the control returns to a prescribed main program. The counter n instructs the initiation of the next periodic diagnosis of the gear pumps 5s and 5p. The normal value Nu of the counter n is set to, for example, 60 min.

In step S8, the control unit 15 is configured to set the value of the counter n to a prescribed value Ns that is smaller than the normal value Nu, and then, the control returns to the main program.

Accordingly, the value of the counter n is varied between two levels (the normal value Nu and the prescribed value Ns) in this embodiment. However, it will be apparent to those skilled in the art from this disclosure that the value of the counter n may also be varied among multiple levels so that the value of the counter n becomes smaller as the atmospheric temperature T decreases. In such case, the counter n can be optimized with more precise settings.

Referring back to step S1, if the control unit 15 determines that the ignition switch has not been just turned on in step S1, then the process advances to step S9. In step S9, the control unit 15 is configured to reduce the value of the counter n by 1 (i.e., decrement the counter n).

In step S10, the control unit 15 is configured to determine whether the value of the abnormality flag f is "1". If the value of the abnormality flag f is "1" (f=1) in step S10, then the control unit 15 determines that the brake-by-wire operation has already been halted due to the pump abnormality, and the process advances to step S17, described later. When the value of the abnormality flag f is "0" (f=0) in step S11, then the control unit 15 determines that there are currently no pump abnormalities detected and that the brake-by-wire operation has been implemented. In such case, the process advances to step S11.

In step S11, the control unit 15 is configured to determine whether the brake operation by the driver is performed (e.g., whether the driver is depressing the brake pedal 1) based on the master cylinder pressure or the pedal stroke. If the control unit 15 determines that the brake operation is performed in step S11, then the control unit 15 determines that pump abnormalities cannot be diagnosed. Thus, the control returns to the prescribed main program without any changes. On the other hand, if the control unit 15 determines that the brake operation is not performed in step S11, then the control unit 15 determines that pump abnormalities can be diagnosed. Thus, the process advances to step S12.

In step S12, the control unit 15 is configured to determine whether the value of the counter n is "0" (n=0). When the value of the counter n is "0" in step S12, then it is determined that a periodic diagnosis for the abnormalities in the gear pumps 5s and 5p is to be performed, and the process advances to step S2 in order perform the diagnosis. When the value of the counter n is not "0" (n>0) in step S12, then it is determined that a periodic diagnosis is not to be performed, and the process advances to step S113.

In step S13, the control unit 15 is configured to determine whether a parking brake PKB has just been operated to apply braking force (e.g., whether the current control cycle is the first control cycle after the parking brake PKB has been operated). When the control unit 15 determines that the parking brake PKB has just been operated in step S13, then it is determined that the foot brake (the brake pedal 1) will not be operated to apply braking force for some time, and the process advances to step S2 in order to perform a final diagnosis as a precautionary measure. When the control unit 15 determines that the parking brake PKB has not been operated in step S113, then it is determined that the foot brake may still be applied, and the process advances to step S14. Also, when the control unit 15 determines that the parking brake PKB has been operated for a while (e.g., the current control cycle is not the first control cycle after the parking brake has been operated), then it is determined that a diagnosis for the abnormalities in the gear pumps 5s and 5p has already been performed immediately after the parking brake PKB was operated, and the process advances to step S14.

In step S14, the control unit 15 is configured to determine whether an operation of an accelerator pedal has just started (i.e., whether the accelerator pedal has just turned ON). When the control unit 15 determines that the operation of the accelerator pedal has just started in step S14, the control unit 15 then determines that the driver is expected to brake but the driver will not start braking yet (i.e., that acceleration operation of the vehicle will continue for some time). Thus, the process advances to step S2 in order to perform a diagnosis before the driver begins to brake. When the control unit 15 determines that the operation of the accelerator pedal has not started in step S14, then it is determined that the driver is not expected to brake, and the process advances to step S15. When the control unit 15 determines that the operation of the accelerator pedal has not just started (the current control cycle is not the first control cycle after the operation of the accelerator pedal has started) in step S14, then it is determined that a diagnosis for the abnormalities in the gear pumps 5s and 5p has already been performed immediately after the driver has started to operate the accelerator pedal, and the process advances to step S15.

In step S15, the control unit 15 is configured to determine whether the vehicle speed V is greater than a prescribed value Vc. The prescribed value Vc is set to a value close to a vehicle creeping speed at which an AT vehicle moves over a flat road by creeping. When the control unit 15 determines that the vehicle speed V is equal to or smaller than the prescribed value Vc (V≦Vc) in step S115, then it is determined that the vehicle speed is not high enough to require braking. Thus, the control returns to the prescribed main program. When the control unit 15 determines that the vehicle speed V is greater than the prescribed value Vc (V>Vc) in step S15, then it is determined that the vehicle speed is high enough to require braking. Thus, the process advances to S16.

In step S16, the control unit 15 is configured to determine whether the previous vehicle speed $V_{(n-1)}$ in the previous control cycle prior to the current control cycle is equal to or less than the prescribed value Vc. When the control unit 15 determines that the previous vehicle speed $V_{(n-1)}$ is equal to or smaller than the prescribed value Vc ($V_{(n-1)}$≦Vc) in step S16 (i.e., when the vehicle speed V has just exceeded the prescribed value Vc), then it is determined that the driver is expected to brake but the driver will not start braking yet. Thus, the process advances to step S2 in order to perform a diagnosis before the driver begins to brake. When the control unit 15 determines that the previous vehicle speed $V_{(n-1)}$ is greater than the prescribed value Vc ($V_{(n-1)}$>Vc) in step S16 (i.e., when the vehicle speed V has exceeded the prescribed value Vc and the current control cycle is not the first control cycle after the vehicle V exceeded the prescribed value Vc), then it is determined that a diagnosis has already been performed immediately after the vehicle speed V exceeded the prescribed value Vc. Thus, the control returns to the prescribed main program.

Referring back to step S10, when the control unit 15 determines that the value of the abnormality flag f is not "0" (f=1) in step S10, then the process advances to step S17. In step S17, the control unit 15 is configured to determine whether the value of the counter n is "0". When the value of the counter n is "0" (n=0) in step S17, then it is determined that a periodic diagnosis for the abnormalities in the gear pumps 5s and 5p is to be performed. Thus, the process advances to step S2 in order to perform the diagnosis. When the value of the counter n is not "0" (n>0) in step S117, then it is determined that a periodic diagnosis is not to be performed. Thus, the control returns to the prescribed main program.

The operation and effects of the first embodiment will now be described.

When a self-diagnosis process is performed to determine whether or not the gear pumps 5s and 5p are operating normally in the conventional vehicle brake apparatus, the hydraulic pressure is monitored at the discharge side of the gear pumps 5s and 5p while the gear pumps 5s and 5p are driven to rotate in the forward direction and the inlet valves 6FR and 6FL remain closed when the driver is not braking. However, the inlet valves 6FR and 6FL are normally opened when the driver is not braking so that the fluid pressure can be transmitted to the wheel cylinders upon the driver starting a brake operation. Therefore, in the conventional vehicle brake apparatus, the inlet valves 6FR and 6FL must be closed every time a pump failure is diagnosed. This may reduce durability of the inlet valves 6FR and 6FL.

On the other hand, in the first embodiment of the present invention, the gear pumps 5s and 5p are configured and arranged to be driven to rotate in the reverse direction in a prescribed procedure (step S2) when the driver is not braking. Thus, abnormalities in the gear pumps 5s and 5p can be diagnosed by determining whether the pump motors are rotating when the gear pumps 5s and 5p are driven (steps S3 through S5).

In the first embodiment of the present invention, the inlet valves 6FR and 6FL may be left open when the self-diagnosis process is performed. Thus, the inlet valves 6FR and 6FL are operated in effect only when braking force is maintained by the brake-by-wire system. Therefore, durability loss in the inlet valves 6FR and 6FL can be reduced. As a result, the valve strength (metal seal hardness, for example) of the inlet valves 6FR and 6FL does not need to be increased. Thus, regular valves commonly used in hydraulic pressure control circuits, such as antilock braking systems (ABS), traction control systems (TCS), stability control systems (VDC: vehicle dynamics control), and the like can therefore be used, and cost increases can be reduced.

Another possibility under consideration is to change the inlet valves 6FR and 6FL to normally closed valves and to drive the gear pumps 5s and 5p to rotate in the forward direction as in the prior art in order to perform the self-diagnosis process of the gear pumps 5s and 5p. However, in such case, the relief valve 8 operates needlessly and sound vibration performance may be reduced because pressure is higher in the discharge side of the gear pumps 5s and 5p. On the other hand, in the first embodiment of the present invention, there is no load imposed on the hydraulic pressure circuits in the discharge side of the gear pumps 5s and 5p because the fluid merely returns to the reservoir tank 2a when the gear pumps 5s and 5p are driven to rotate in the reverse direction. The hydraulic circuits on the intake side at this time are tightly sealed by the relief valve 8 and the check valve 9, and thus, negative pressure is generated. However, the rotations of the pump motors are not hindered by the negative pressure because the pump motors are rotated in the reverse direction by a slight amount (⅙ rotation in the first embodiment) at which the rotation angle of the pump motors reaches the resolution of the rotation sensor 26.

When the gear pumps 5s and 5p are driven to rotate in the reverse direction, the prescribed electric current is applied to the pump motors for the prescribed period of time (step S2). The prescribed electric current is set to a starting current at which the motor torque reaches a maximum value. Therefore, a misdiagnosis of abnormalities in the gear pumps 5s and 5p can be prevented because the pump motors rotate without fail if the gear pumps 5s and 5p are in the normal state. The prescribed period of time is set to the time required for the motor rotation angle to reach the resolution of the rotation sensor 26 after the gear pumps 5s and 5p begin to be driven to rotate from the normal state. The drive time can thereby be reduced to a minimum amount, and pump abnormalities can therefore be reliably detected while the increases in power consumption are prevented.

When the gear pumps 5s and 5p are driven to rotate in the reverse direction, a diagnosis can be performed easily and in a short amount of time because pump abnormalities can be diagnosed merely by determining whether the pump motors are rotating (step S3).

In the first embodiment of the present invention, the timing with which the diagnosis for the abnormalities in the gear pumps 5s and 5p is performed is as follows.

(1) When the ignition switch is turned on (Yes in step S1), then the following occurs. This turning on of the ignition switch corresponds to the timing to perform the initial diagnosis before the brake-by-wire system is initiated. Even if the ignition switch is turned on while the driver is depressing the brake pedal 1, the brake-by-wire system has not yet been implemented at this time (i.e., a normal braking state is in effect). In this state, the hydraulic pressure of the master cylinder 2 is transmitted directly to the wheel cylinders 3FR and 3FL. The self-diagnosis can therefore be performed regardless of whether the driver is braking. This is because the check valve 9 operates in the same manner as when the inlet valves 6FR and 6FL are closed even if the gear pumps 5s and 5p are driven to rotate in the reverse direction, whereby the hydraulic pressure transmitted to the wheel cylinders 3FR and 3FL is maintained.

(2) When value of the counter n is "0" (Yes in step S112), then the following occurs. The value of the counter n being "0" corresponds to the timing to perform a normal periodic diagnosis. The periodic diagnosis cycle is shortened (i.e., the value of the counter n is set to the prescribed value Ns that is less than the normal value Nu) (step S8) when the atmospheric temperature T falls to a prescribed value Tc or less (No in step S6). This is because the atmospheric temperature T may cause the fluid viscosity to increase or the gear pumps 5s and 5p to freeze (particularly in cold areas) when the atmospheric temperature is equal to or less than the prescribed value Tc. The abnormalities in the gear pumps 5s and 5p can therefore be quickly detected in environments that cause the fluid viscosity to increase or the gear pumps 5s and 5p to freeze. Situations may arise in which the vehicle is driven on a high-speed road, the driver does not brake for some time, and the brake-by-wire continues to remain idle. In such situations, heat generated by driving the gear pumps 5s and 5p can prevent the fluid viscosity from increasing and the gear pumps 5s and 5p from freezing if the cycle of the periodic diagnosis is shortened and the drive frequency of the gear pumps 5s and 5p is increased.

(3) When the parking brake PBK is set to on (Yes in step S113), then the following occurs. The parking brake PBK being set to on corresponds to the timing to perform the final diagnosis before the brake-by-wire system is halted. Specifically, if the parking brake PBK is operated to apply parking brake to the vehicle, the foot brake (the brake pedal 1) is not expected to be operated for some time, and the brake-by-wire system is expected to continue to remain idle.

(4) When the operation of the accelerator begins (Yes in step S14), then the following occurs. This start of the operation of the accelerator corresponds to the timing to perform a preliminary diagnosis before the driver begins to brake. Specifically, if the operation of the accelerator begins and the vehicle accelerates, then the vehicle naturally must decelerate at some point. Therefore, it is expected that the driver will brake. If abnormalities have occurred in the gear pumps 5s and 5p, the abnormalities can thereby be reliably detected before the driver begins to brake.

The gear pumps 5s and 5p are driven to rotate in the reverse direction, which is opposite of the direction in which the gear pumps 5s and 5p are driven when the hydraulic pressure increases in the wheel cylinders 3FR and 3FL. Therefore, the rotating direction cannot be suddenly switched due to the inertial force of the pump motors, even if the gear pumps 5s and 5p are driven to rotate in the forward direction in order to increase the hydraulic pressure in the wheel cylinders 3FR and 3FL after the gear pumps 5s and 5p were previously being driven in the reverse direction for the self-diagnosis process. Therefore, the responsiveness of the wheel cylinder pressure may be reduced when the self-diagnosis process is performed immediately before the driver begins to brake (when the driver begins to brake immediately after the self-diagnosis process is performed).

However, braking, although possible, is not expected to be initiated immediately after the vehicle begins to accelerate (i.e., immediately after the driver starts the operation of the accelerator). Therefore, situations in which the responsiveness of the wheel cylinder pressure is reduced such as described above can be avoided if the self-diagnosis is performed when the operation of the accelerator begins as in the first embodiment of the present invention.

(5) When the vehicle speed V exceeds a creeping speed (Yes in steps S15 and S16), then the following occurs. The vehicle speed V exceeding a creeping speed (e.g., the prescribed value Vc) corresponds to the timing to perform the preliminary diagnosis before the driver begins to brake. When an AT vehicle begins to move as a result of a creep torque or when an MT vehicle begins to move on a sloped road, the operation of the accelerator may not necessarily be performed in order to move the vehicle. Therefore, if the vehicle accelerates without the operation of the accelerator by the driver, a self-diagnosis is performed at this time because the driver is expected to brake. Therefore, any abnormalities occurring in the gear pumps 5s and 5p can be reliably detected before the driver begins to brake.

When the rotation of the gear pumps 5s and 5p (rotation of the pump motors) are not detected during the self-diagnosis process (No in step S3), then it is determined that the pump abnormalities resulting from contamination, increased-viscosity fluid, or frozen pumps are detected in either of the gear pumps 5s and 5p. Thus, the value of the abnormality flag is set to "1" (step S5), and the brake-by-wire system is halted by the fail-safe operation. Neither of the brake actuators 10p and 10s is operated at this time, but the braking force of the front wheels can be ensured because the master cylinder 2 and the front left and front right wheel cylinders 3FL and 3FR are communicated and mechanically backed up.

Even when the pump abnormalities may be detected at first, it is possible that an increase in the atmospheric temperature can reduce the fluid viscosity or unfreeze the gear pumps 5s and 5p to restore the drive capacity of the gear pumps 5s and 5p. Thus, a periodic diagnosis is executed even after the abnormalities are detected (step S17). The brake-by-wire system is not executed at this time; i.e., normal braking system is in effect. In the normal braking system, the hydraulic pressure of the master cylinder 2 is transmitted directly to the wheel cylinders 3FR and 3FL. Therefore, a self-diagnosis can be performed regardless of whether the driver is braking for the same reasons as with the initial diagnosis previously described.

Figure 6:
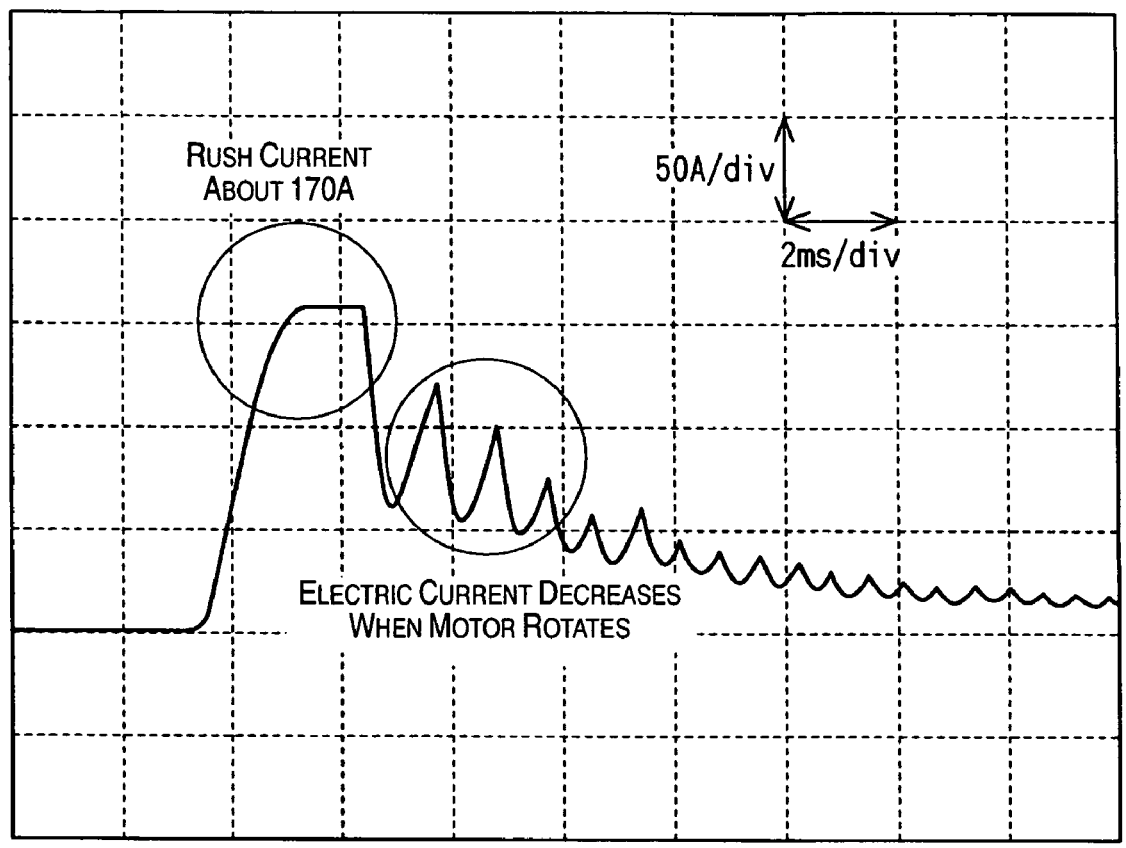
FIG. 6 is a time chart illustrating the characteristics of a motor electric current of the pump motor in accordance with the first embodiment of the present invention.

In the first embodiment of the present invention, the rotation sensor 26 is configured and arranged to detect rotations of the pump motors. However, the present invention is not limited to such arrangement. More specifically, as shown in FIG. 6, when a pump motor in a normal state is driven to rotate, a large starting current is created immediately after the start of driving, and the electric current value then decreases when the motor begins to rotate. Therefore, the vehicle brake apparatus of the present invention may be arranged to determine that the pump motors are rotating if a reduction in the motor electric currents is detected while the gear pumps 5s and 5p are driven to rotate and to determine that the pump motors are not rotating if a reduction in the motor electric currents is not detected.

In the conventional vehicle brake apparatus in which a pressure sensor detects the hydraulic pressure in the discharge side of the gear pumps when the gear pumps are driven to rotate and the climb gradient of the hydraulic pressure is monitored to diagnose pump abnormalities, a certain amount of time is needed to diagnose whether or not pump abnormalities have occurred because the hydraulic pressure increases after the gear pumps actually begin to rotate. On the other hand, when whether or not the pump motors are rotating is detected in accordance with the reduced state of the monitoring electric current, and pump abnormalities are diagnosed in accordance with the detection results, the climb gradient of the hydraulic pressure can be diagnosed sooner than in the case of monitoring the hydraulic pressure. This is advantageous in terms of sound vibration performance because the driving of the pump motors can be rapidly halted.

In the first embodiment present embodiment, a self-diagnosis process is performed each time the acceleration operation is initiated. However, the present invention is not limited to this arrangement. More specifically, in cases in which the acceleration operation is repeatedly turned on and off, the self-diagnosis is performed many times within a short time period. Therefore, measures may be taken to prevent the diagnosis from being performed until a specific time period has elapsed once the diagnosis is performed even when the other conditions for performing the self-diagnosis are met.

A hydraulic brake using fluid pressure as a transmission medium is used as an example of the brake system in the first embodiment. However, the present invention is not limited to this arrangement. An air brake using compressed air as a transmission medium may also be used to carry out the present invention.

Figure 7:
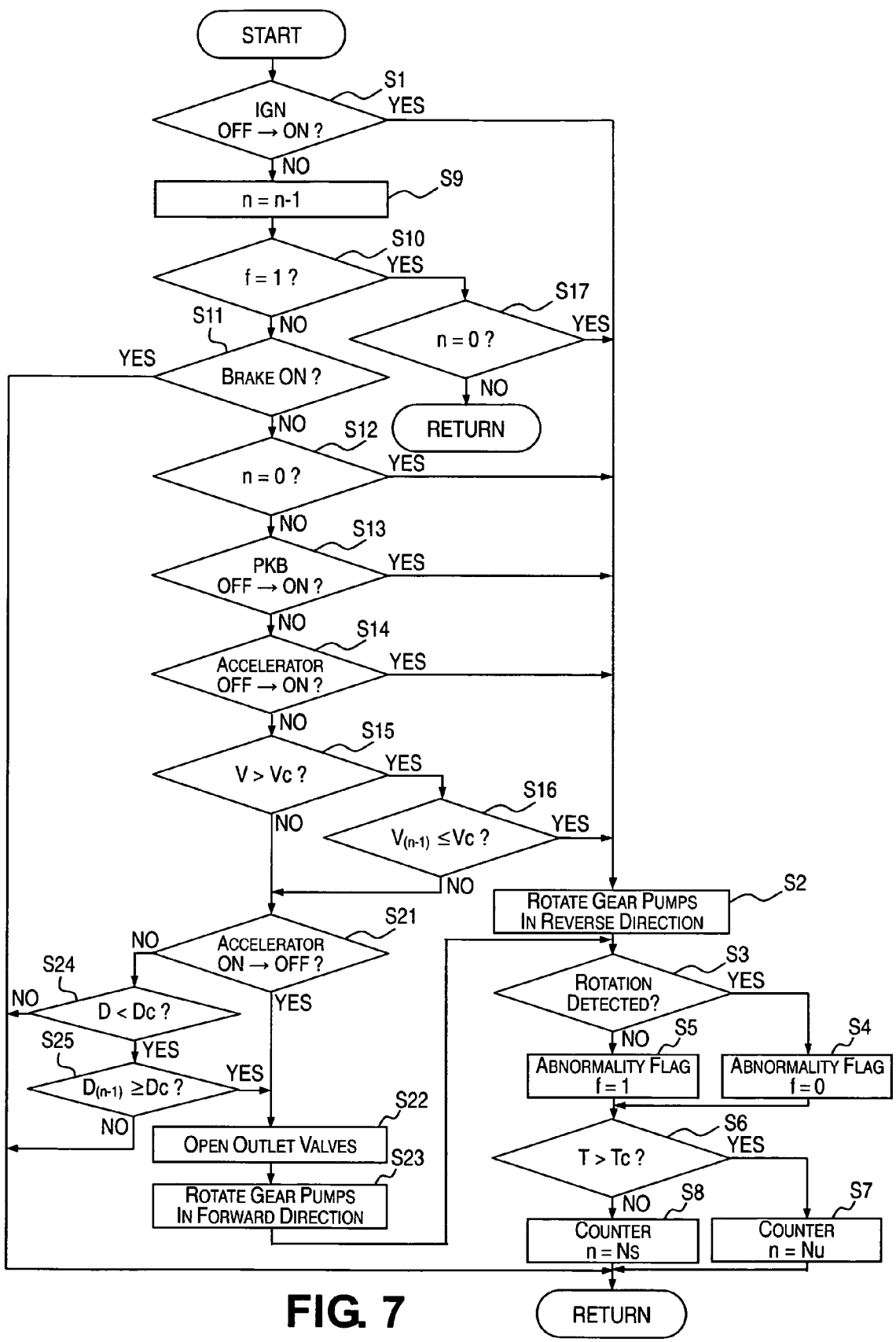
FIG. 7 is flowchart illustrating a self-diagnosis process executed in the control unit of the vehicle brake apparatus in accordance with a second embodiment of the present invention.

Referring now to FIG. 7, a vehicle brake apparatus in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The vehicle brake apparatus of the second embodiment is identical to the vehicle brake apparatus of the first embodiment except that a self-diagnosis process according to a flowchart of FIG. 7 is executed in the control unit 15 instead of the self-diagnosis process according to the flowchart of FIG. 2. More specifically, the self-diagnosis process of the second embodiment differs from the self-diagnosis process of the first embodiment in that, in the second embodiment, the self-diagnosis process for abnormalities in the gear pumps 5s and 5p can also be performed immediately before the driver begins to brake. The overall structures of the vehicle brake apparatus of the second embodiment is the same as the structures of the vehicle brake apparatus of the first embodiment as shown in FIG. 1.

The control process executed in steps S1 to S16 in FIG. 7 is identical to the control process executed in steps S1 to S16 in FIG. 2. Therefore, the descriptions of the control process executed in step S1 to S116 are omitted for the sake of brevity. In the second embodiment, the control process in steps S21 through S25 are performed where appropriate when the determination in step S15 or S16 is No in FIG. 7.

First, in step S21, the control unit 15 is configured to determine whether the operation of the accelerator has just ended (i.e., whether the current control cycle is the first control cycle after the operation of the accelerator ended). When the control unit 15 determines that the operation of the accelerator has just ended in step S21, then it is determined that the driver is expected to brake and the braking operation will begin. Thus, the procedure advances to step S22 in order to perform a self-diagnosis for abnormalities in the gear pumps 5s and 5p until the braking operation begins. When the control unit 15 determines that the operation of the accelerator has not ended yet, then it is determined that the braking operation will not begin, and the procedure advances to step S24, which will be described later. When the control unit 15 determines in step S21 that the operation of the accelerator ended but the current control cycle is not the first control cycle after the operation of the accelerator ended, then it is determined that a self-diagnosis for the abnormalities in the gear pumps 5s and 5p has already been performed immediately after acceleration ended. Thus, the procedure advances to step S24.

In step S22, the control unit 15 is configured to energize and open the outlet valves 7FR and 7FL for a prescribed period of time. The prescribed period of time used in step S22 is preferably the same as the prescribed period of time during which the gear pumps 5s and 5p are driven to rotate in step S2 previously described.

Next, in step S23, the control unit 15 is configured to apply a prescribed electric current to the pump motors of the gear pumps 5s and 5p for a prescribed amount of time to rotate the gear pumps 5s and 5p in the forward direction, and the procedure then advances to step S3. The prescribed electric current and the prescribed amount of time used in step S23 are preferably the same as the prescribed electric current and the prescribed amount of time at which the gear pumps 5s and 5p are driven to rotate in step S2 previously described.

Referring back to step S21, when the control unit 15 determines that the operation of the accelerator has not just ended in step S21, then the procedure advances to step S24. In step S24, the control unit 15 is configured to determine whether an inter-vehicle distance D to a preceding vehicle, which is driving in front of the vehicle (host vehicle), is less than a prescribed value Dc. The inter-vehicle distance D is detected by a laser radar or another such distance-measuring device mounted on the vehicle. The prescribed value Dc is preferably set to a value that is slightly less than a threshold inter-vehicle distance at which an inter-vehicle control system (ACC: Adaptive Cruise Control) automatically applies the brake, for example. When the control unit 15 determines that the inter-vehicle distance D is equal to or greater than the prescribed value Dc (D≧Dc) in step S24, then it is determined that the inter-vehicle distance D does not require that braking be initiated. Thus, the control returns to the prescribed main program. When the control unit 15 determines that the inter-vehicle distance D is smaller than the prescribed value Dc (D<Dc) in step S24, then it is determined that the vehicle has drawn close to the preceding vehicle to a distance that requires that braking be initiated. Thus, the process advances to step S25.

In step S25, the control unit 15 is configured to determine whether the previous inter-vehicle distance $D_{(n-1)}$ detected in the previous control cycle is equal to or greater than the prescribed value Dc. When the control unit 15 determines that the previous inter-vehicle distance $D_{(n-1)}$ is equal to or greater than the prescribed value Dc ($D_{(n-1)}$≧Dc) (i.e., when the inter-vehicle distance D has just fallen below the prescribed value Dc) in step S25, then it is determined that the driver is expected to brake and the braking operation will begin. Thus, and the process advances to S22 in order to perform a self-diagnosis for abnormalities in the gear pumps 5s and 5p until braking begins. When the control unit 15 determines that the previous inter-vehicle distance $D_{(n-1)}$ is smaller than the prescribed value Dc, ($D_{(n-1)}$<Dc) (i.e., when the current control cycle is not the first control cycle after the inter-vehicle distance D fell below the prescribed value Dc) in step S25, then it is determined that the self-diagnosis for abnormalities in the gear pumps 5s and 5p has already been performed immediately after the inter-vehicle distance D fell below the prescribed value Dc. Thus, the control returns to the prescribed main program.

In the second embodiment described above, the inter-vehicle distance D is used to predict or estimate occurrence of the brake operation by the driver. However, it will be apparent to those skilled in the art from this disclosure that the occurrence of the brake operation by the driver can be predicted in accordance with the relative speed with respect to the preceding vehicle, the vehicle's own speed, or the time interval between the preceding vehicle and the host vehicle. Thus, with the second embodiment of the present invention, the occurrence of the brake operation by the driver can be estimated with greater accuracy.

As described above, the outlet valve 7FR (or 7FL) preferably corresponds to the second valve of the present invention. Moreover, the control process described in the flowchart of FIG. 7 corresponds to the diagnosis section of the second embodiment of the present invention.

The operation and effects of the second embodiment will be described.

Unlike the self-diagnostic process in the first embodiment described above, the outlet valves 7FR and 7FL are opened (step S22) and the gear pumps 5s and 5p are driven to rotate in the forward direction by a prescribed procedure (step S23) when the driver is not braking in the second embodiment. Therefore, it is possible to diagnose abnormalities in the gear pumps 5s and 5p according to whether or not the pump motors are rotating at the time (steps S3 through S5).

The self-diagnostic process in step S2 is referred to as a reverse-rotation diagnosis, and the self-diagnostic processes in steps S22 and S23 are referred to as a forward-rotation diagnosis, in order to distinguish between the two diagnostic methods.

In the forward-rotation diagnosis (steps S22 and S23), the fluid returns to the reservoir tank 2a via the outlet valves 7FR and 7FL and the fluid is merely circulated (refluxed) even when the gear pumps 5s and 5p are rotated in the forward direction. The pump motors can therefore be rotated when there is virtually no load apart from the viscous resistance of the fluid, and sound vibration performance is improved. The forward-rotation of the gear pumps 5s and 5p dose not cause the hydraulic pressure to be increased in the wheel cylinders 3FR and 3FL because the outlet valves 7FR and 7FL are opened, which is therefore consistent with the intentions of the driver who has not begun to brake.

Furthermore, the gear pumps 5s and 5p are driven to rotate in the forward direction, which is the same direction as when the hydraulic pressure increases in the wheel cylinders 3FR and 3FL. Therefore, when an attempt is made to drive the gear pumps 5s and 5p to rotate in the forward direction in order to increase the hydraulic pressure in the wheel cylinders 3FR and 3FL after the gear pumps 5s and 5p have previously been driven in the forward direction for the self-diagnosis, a smooth transition to the pressure-increasing process can be made by the inertial force of the pump motors.

Therefore, the forward-rotation diagnosis is performed with the following timing.

(1) When the operation of the accelerator has just ended (Yes in step S21), then the following occurs. The end of the operation of the accelerator corresponds to the timing to perform a preliminary diagnosis (forward-rotation diagnosis) immediately before the driver begins to brake. Specifically, ending of the operation of the accelerator naturally means that the vehicle does not need to accelerate, and the driver is expected to brake.

If there are no abnormalities in the gear pumps 5s and 5p, the hydraulic pressure in the wheel cylinders 3FR and 3FL can be rapidly increased even if the driver begins to brake immediately after the forward-rotation diagnosis is performed. The hydraulic pressure can be increased in synchronization with the inertial force of the pump motors, which had been driven to rotate in the forward direction during the self-diagnosis process. Therefore, even if the self-diagnosis is performed immediately before the driver begins to brake (even if the driver begins to brake immediately after the self-diagnosis), the responsiveness of wheel cylinder pressure is not reduced and is improved in cases in which the forward-rotation diagnosis is performed. If there are abnormalities in the gear pumps 5s and 5p, the abnormalities can be reliably detected before the driver begins to brake.

(2) When the inter-vehicle distance D has fallen below the prescribed value Dc (Yes in steps S24 and S25), then the following occurs. The inter-vehicle distance D falling below the prescribed value Dc corresponds to the timing to performing the preliminary diagnosis immediately before the driver begins to brake. Specifically, if the inter-vehicle distance D becomes shorter, the vehicle naturally must decelerate, and it is expected that the driver will brake. Any abnormalities in the gear pumps 5s and 5p can thereby be reliably detected before the driver begins to brake.

Similarly to the first embodiment, in the second embodiment of the present invention, the reverse-rotation diagnosis is performed when the ignition is turned on (Yes in step S1), when the value of the counter n is 0 (Yes in step S17), and when the parking brake is applied (Yes in step S113). However, the forward-rotation diagnosis may also be performed in any of these cases as well.

Moreover, in the second embodiment, the reverse-rotation diagnosis is performed each time the operation of the accelerator begins (Yes in step S14), and the forward-rotation diagnosis is performed each time the operation of the accelerator ends (Yes in step S21), but the present invention is not limited to this arrangement. More specifically, the diagnosis may be unnecessarily performed twice when the operation of the accelerator begins and ends in such arrangement. Therefore, it is acceptable to omit the control process in step S14 and the control process in steps S15 and S16 (which determine whether the vehicle speed V has just exceeded the prescribed value Vc) in the second embodiment.

Accordingly, with the vehicle braking apparatus according to the present invention, the abnormalities in the gear pumps 5s and 5p can be diagnosed while the inlet valves 6FR and 6FL remain open, because the gear pumps 5s and 5p are driven to rotate in the reverse direction and the abnormalities in the gear pumps 5s and 5p are diagnosed based on the rotating state of the gear pumps 5s and 5p when the driver is not braking. Therefore, there is no need to operate the inlet valves 6FR and 6FL at least when the abnormalities in the gear pumps 5s and 5p are diagnosed. Thus, durability loss in the inlet valves 6FR and 6FL can be suppressed. The fluid is returned to the reservoir tank 2a when the gear pumps 5s and 5p are driven to rotate in the reverse direction, whereby the fluid pressure circuits are relieved from loads.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle brake apparatus comprising:
    a wheel cylinder configured and arranged to generate a braking force with a fluid pressure of a fluid transmitted from a fluid source;
    a pump disposed in a first channel between the fluid source and the wheel cylinder, and configured and arranged to selectively rotate in one of a first direction that generates the braking force in the wheel cylinder and a second direction that does not generate the braking force in the wheel cylinder;
    a first valve configured and arranged to selectively close the first channel between the pump and the wheel cylinder;
    a brake control section configured to
        control the first valve to open the first channel between the pump and the wheel cylinder and control the pump to rotate in the first direction so that a discharge pressure from the pump is transmitted to the wheel cylinder when the braking force is increased in accordance with a brake operation by a driver,
        control the first valve to close the first channel between the pump and the wheel cylinder when the braking force is maintained in accordance with the brake operation by the driver, and
        control the pump to rotate in the second direction when the brake operation by the driver is not performed, the vehicle is traveling and the first valve is open to open the first channel; and
    a diagnosis section configured to diagnose abnormalities in the pump based on a rotation state of the pump that is determined while the pump is controlled to rotate in the second direction.

2. The vehicle brake apparatus according to claim 1, further comprising
    a second valve configured and arranged to selectively open a second channel that fluidly communicates the fluid source with the wheel cylinder,
    the brake control section being further configured to control the first valve to open the first channel between the pump and the wheel cylinder, to control the second valve to open the second channel, and to control the pump to rotate in the first direction when the brake control section determines that the brake operation by the driver will be initiated,
    the diagnosis section being further configured to detect the rotation state of the pump while the pump is controlled to rotate in the first direction when the brake control section determines that the brake operation by the driver will be initiated, and to diagnose abnormalities in the pump based on the rotation state of the pump.

3. The vehicle brake apparatus according to claim 1, wherein
    the brake control section is configured to apply a prescribed motor starting current to a pump motor coupled to the pump to rotate the pump when the diagnosis section diagnoses abnormalities in the pump.

4. The vehicle brake apparatus according to claim 1,
    wherein the diagnosis section includes a rotation detecting section configured and arranged to detect whether the pump is rotating as the rotation state of the pump,
    the diagnosis section being further configured to diagnose that the pump has abnormalities when the rotating of the pump is not detected by the rotation detection section while the brake control section controls the pump to rotate.

5. The vehicle brake apparatus according to claim 4, wherein
the brake control section is configured to calculate a resolution period required for a rotational angle of the pump to reach a resolution of the rotation detecting section after the pump starts rotating from a normal state, and to control the pump to rotate for the resolution period when the diagnosis section diagnoses abnormalities in the pump.

6. The vehicle brake apparatus according to claim 5, wherein
the rotation detecting section is configured and arranged to detect the rotating of the pump based on a reduction in a motor electric current of a pump motor coupled to the pump.

7. The vehicle brake apparatus according to claim 2, wherein
the brake control section is configured to apply a prescribed motor starting current to a pump motor coupled to the pump to rotate the pump when the diagnosis section diagnoses abnormalities in the pump.

8. The vehicle brake apparatus according to claim 7, further comprising
a rotation detecting section configured and arranged to detect whether the pump is rotating as the rotation state of the pump,
the diagnosis section being further configured to diagnose that the pump has abnormalities when the rotating of the pump is not detected by the rotation detection section while the brake control section controls the pump to rotate.

9. The vehicle brake apparatus according to claim 8, wherein
the brake control section is configured to calculate a resolution period required for a rotational angle of the pump to reach a resolution of the rotation detecting section after the pump starts rotating from a normal state, and to control the pump to rotate for the resolution period when the diagnosis section diagnoses abnormalities in the pump.

10. The vehicle brake apparatus according to claim 9, wherein
the rotation detecting section is configured and arranged to detect the rotating of the pump based on a reduction in a motor electric current of a pump motor coupled to the pump.

11. A vehicle brake apparatus comprising:
braking force generating means for generating a braking force with a fluid pressure of a fluid transmitted from a fluid source;
fluid pumping means for selectively rotating in one of a first direction for transmitting a discharge pressure of a fluid to the braking force generating means and a second direction for not transmitting the discharge pressure of the fluid to the braking force generating means;
channel closing means for selectively closing a channel between the fluid pumping means and the braking force generating means;
brake control means for
controlling the channel closing means to open the channel between the fluid pumping means and the braking force generating means and controlling the fluid pumping means to rotate in the first direction so that the discharge pressure of the fluid is transmitted to the braking force generating means when the braking force is increased in accordance with a brake operation by a driver,
controlling the channel closing means to close the channel between the fluid pumping means and the braking force generating means when the braking force is maintained in accordance with the brake operation by the driver, and
controlling the fluid pumping means to rotate in the second direction when the brake operation by the driver is not performed, the vehicle is traveling and the channel closing means is open to open the channel; and
diagnosing means for detecting a rotation state of the fluid pumping means while the fluid pumping means is controlled to rotate in the second direction and for diagnosing abnormalities in the fluid pumping means based on the rotation state of the fluid pumping means.

12. A pump abnormality diagnosing method for a vehicle comprising:
selectively rotating a pump disposed in a channel between a fluid source and a wheel cylinder in one of a first direction that generates the braking force in the wheel cylinder and a second direction that does not generate the braking force in the wheel cylinder;
controlling the pump to rotate in the second direction when a brake operation by a driver is not performed;
detecting a rotation state of the pump while the pump is controlled to rotate in the second direction, the vehicle is traveling and the channel between the fluid source and the wheel cylinder is open; and
diagnosing abnormalities in the pump based on the rotation state of the pump.

13. The vehicle brake apparatus according to claim 1, wherein
the brake control section is configured to apply a motor starting current to a pump motor coupled to the pump to rotate the pump when an operation of an accelerator pedal has just started.

14. The vehicle brake apparatus according to claim 2, wherein
the brake control section is configured to apply a motor starting current to a pump motor coupled to the pump to rotate the pump when an operation of an accelerator pedal has just ended.

* * * * *